United States Patent [19]

Nichoalds

[11] Patent Number: 4,924,782

[45] Date of Patent: May 15, 1990

[54] WHEELED TABLE

[75] Inventor: Donald L. Nichoalds, Libertyville, Ill.

[73] Assignee: Luxor Corporation, Waukegan, Ill.

[21] Appl. No.: 398,455

[22] Filed: Aug. 25, 1989

[51] Int. Cl.$^5$ .............................................. A47B 14/00
[52] U.S. Cl. .................................... 108/27; 280/47.35
[58] Field of Search ............................ 108/24, 27, 43; 280/47.35, 79.11

[56] References Cited

U.S. PATENT DOCUMENTS

| | | | |
|---|---|---|---|
| 1,420,061 | 6/1922 | Rappeline | 108/24 |
| 2,656,633 | 10/1953 | Bergen | 108/43 |
| 3,734,526 | 5/1973 | Propst et al. | 280/47.35 X |
| 4,494,755 | 1/1985 | Caillouet, Jr. | 108/43 X |
| 4,620,637 | 11/1986 | Karashima | 280/47.35 X |

Primary Examiner—Peter A. Aschenbrenner
Attorney, Agent, or Firm—Wood, Phillips, Mason, Recktenwald & VanSanten

[57] ABSTRACT

A wheeled table including a base section, wheels mounted to the base section, a tabletop carried on an upper section above the base section and having an upstanding peripheral wall, and a pad removably carried on the upper surface of the tabletop. The tabletop and pad have aligned elongated openings adjacent to and extending parallel to one end of the tabletop. The openings cooperate with the upstanding edge wall to provide improved handle means for manipulating the table when desired. The upstanding edge wall further provides for maintained positioning of the pad on the tabletop.

16 Claims, 1 Drawing Sheet

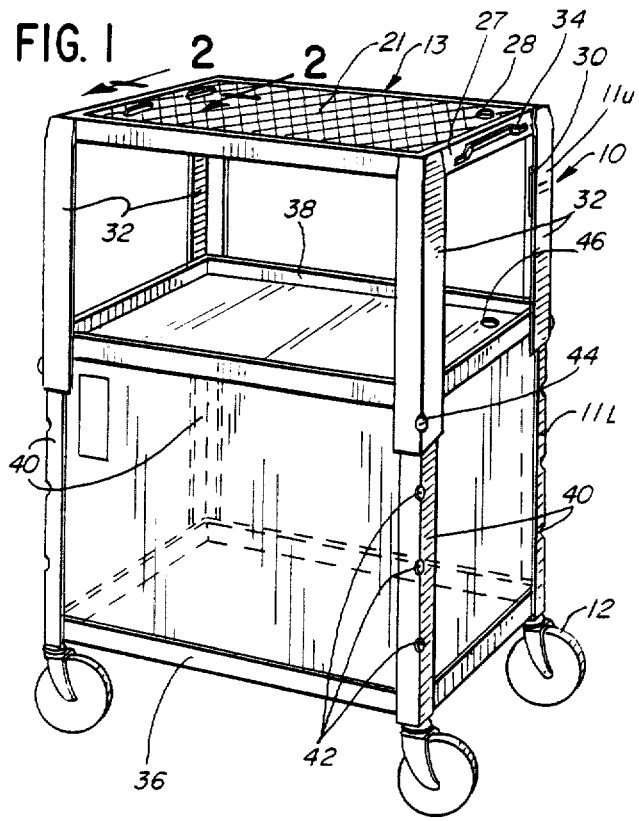
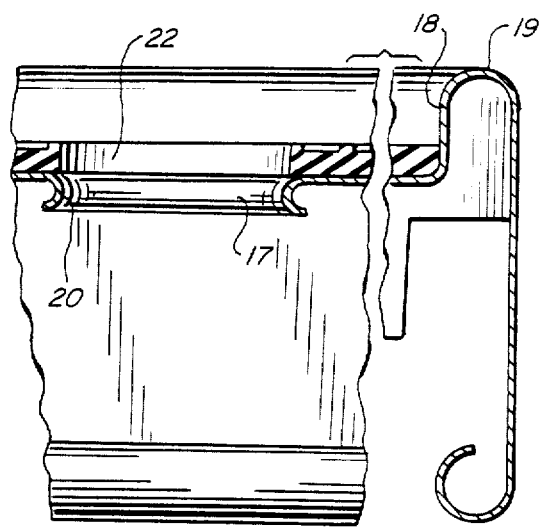
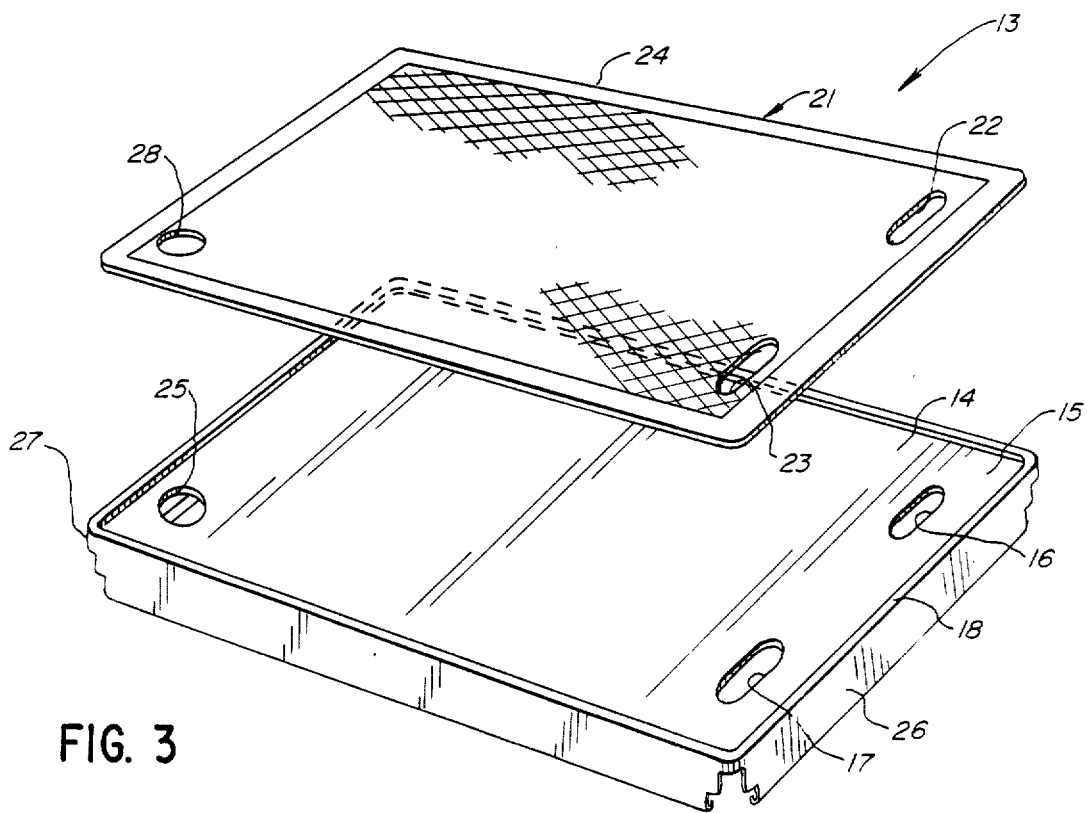

WHEELED TABLE

TECHNICAL FIELD

This invention relates to table constructions and, in particular, to wheeled table constructions.

BACKGROUND ART

One conventional form of wheeled table includes corner uprights having, at their lower ends, suitable casters, and supporting at their upper ends, a tabletop.

It is conventional with such tables to provide a handle at one or both ends thereof for use in moving the table on the casters across a subjacent floor surface, as desired.

It is further conventional in such tables to provide locking means on the casters for locking the table in a desired position once it is moved thereto.

DISCLOSURE OF INVENTION

The present invention comprehends an improved wheeled table wherein the handle means are formed integrally with the tabletop.

More specifically, the invention comprehends provision of such a wheeled table wherein the tabletop defines an edge portion provided with an elongated opening spaced inwardly from a peripheral edge thereof. The opening is adapted for extension of the fingers of a user's hand downwardly through the upper surface of the tabletop, with the palm of the user's hand overlying the edge portion of the tabletop outwardly from the opening.

The invention comprehends the provision of upstanding means at the peripheral edge of the tabletop for causing the user's palm to be elevated from the flat plane of the tabletop upper surface.

In the illustrated embodiment, the upstanding means comprises a peripheral wall having a rounded upper edge.

The invention comprehends that the peripheral wall adjacent the opening extend at least fully the length of the opening.

A rounded bead is provided, in the illustrated embodiment, at a lower edge of the opening for engagement by the user's fingers extended through the opening.

The invention further comprehends provision of a pad removably carried on the tabletop surface and having an opening substantially congruent with the tabletop opening.

An upstanding flange is provided on the tabletop for maintaining the pad against transverse displacement.

In the illustrated embodiment, the upstanding flange defines upstanding means at the peripheral edge of the tabletop for causing the user's palm to be elevated from the flat plane of the tabletop surface adjacent the elongated opening therein.

The pad is preferably formed of a resilient sheet material.

In the illustrated embodiment, the upstanding means comprises an upstanding wall extending substantially fully about the pad.

In the illustrated embodiment, the tabletop is provided with a second opening having a configuration different from the elongated opening and the pad includes an opening substantially congruent with the second tabletop opening.

The wheeled table construction of the present invention is extremely simple and economical, while yet providing for facilitated movement of the tabletop.

BRIEF DESCRIPTION OF THE DRAWING

Other features and advantages of the invention will be apparent from the following description taken in connection with the accompanying drawing.

FIG. 1 is a perspective view of a wheeled table embodying the invention;

FIG. 2 is a fragmentary enlarged vertical section taken substantially along the line 2—2 of FIG. 1; and FIG. 3 is an exploded perspective view of the tabletop and pad thereof.

BEST MODE FOR CARRYING OUT THE INVENTION

In the illustrative embodiment of the invention as disclosed in the drawing, a wheeled table generally designated 10 is shown to comprise a base or lower section 11L having wheels 12 and an upper section 11U. In the illustrated embodiment, the wheels comprise lockable casters of conventional construction.

The upper section 11U includes tabletop generally designated 13. The tabletop includes a flat upper surface 14. An edge portion 15 of the tabletop is provided with a pair of elongated openings 16 and 17 spaced inwardly from a peripheral edge 18 of edge portion 15.

The peripheral edge of the tabletop is defined by an upstanding wall, or turned flange, having a rounded upper surface 19. The spacing of the openings 16 and 17 from the edge 18 is preselected to permit extension of the fingers of a user's hand downwardly through the upper surface of the tabletop, with the palm of the user's hand overlying the rounded surface 19 outwardly from the opening. As a result of the upward extension of the edge wall 18, the palm of the user's hand is elevated from the flat plane of the surface 14, thereby automatically guiding the user's fingers downwardly through the opening.

As further shown in FIG. 2, the elongated opening 17 is defined by a downwardly curved returned flange, or bead, 20 for providing improved surface contact with the user's fingers in use.

In the illustrated embodiment, the peripheral wall 18 extends fully about the periphery of tabletop 13, as best seen in FIG. 3. Thus, the wall extends at least fully the length of the openings 16 and 17 adjacent thereto.

The invention further comprehends provision of a removable pad 21 on the top surface 14. The pad is provided with a pair of openings 22 and 23 substantially congruent with the tabletop openings 16 and 17. The periphery 24 of the pad is substantially congruent with the inner surface of the peripheral wall 18 of the tabletop and, thus, the wall 18 defines means for maintaining the pad against transverse displacement on the tabletop, thereby maintaining the desired alignment of the openings 22 and 23 with openings 16 and 17, respectively.

In the illustrated embodiment, tabletop 13 defines opposite ends 26 and 27. End 26 is substantially planar and the longitudinal extent of the elongated openings 16 and 17 are parallel thereto, as shown in FIG. 3.

In the illustrated embodiment, tabletop 13 is formed of a rigid material, such as metal or molded synthetic resin. Pad 21 is preferably formed of a resilient material, such as rubber, or a resilient synthetic resin.

Tabletop 13 may be provided with at least one additional opening, such as opening 25 for receiving an electrical cord, and pad 21 may be provided with one or more corresponding openings, such as opening 28 aligned with opening 25. Here again, the wall 18 maintains the pad positioned on the tabletop so as to maintain alignment of opening 28 with opening 25.

As shown in FIG. 2, the thickness of the pad 21 is substantially less than the height of edge wall 18, so that the user's fingers may extend downwardly from the user's palm resting on surface 19 through the aligned openings 22 and 17.

In use, an electrical cord for audio-visual equipment or the like may be inserted through the openings 28 and 25 for connection to an outlet assembly 30 which includes a suitable extension cord (not shown) for connecting to an electrical supply. Specifically, the outlet 30 is mounted to one of the four angular legs 32 supporting the tabletop 13 at its four corners. A cord wrap bracket 34 is mounted at the one end 27 of the tabletop for storing the outlet assembly 30 electrical cord.

The lower section 11L includes a bottom shelf 36 subjacent a middle shelf 38 interconnected by opposite angular legs 40 connected at each corner. The lower section 11L between the shelves 36 and 38 may be enclosed by suitable wall structure, or doors, as illustrated in phantom.

Each of the lower section legs 40 includes a plurality of corner apertures 42 which are equally longitudinally spaced. The apertures 42 are provided for receiving a fastener 44 insertable through an opening in the upper section legs 32. Particularly, the height of the upper section 11U can be adjusted by selectively aligning the apertures in the upper legs 32 with one of the select apertures 42 in each of the corresponding lower legs 40 and inserting the fastener 44 to provide the select height. The upper shelf 38 also includes an aperture 46 through which an electrical cord can be inserted for connection to the outlet assembly 30.

Alternatively, if it is desired to have the table 10 of fixed height, then unitary legs of a fixed height could be provided for fixedly mounting the tabletop 13 relative to the height of the lower shelf 36 and middle shelf 38.

Thus, the improved wheeled table construction provides for an improved manipulation of the wheeled table by the user's hand extending through the aligned elongated openings, with the palms of the user's hands pressing on the edge wall surface 19 so as to direct the user's hands automatically into the openings. The rounded surfaces 19 and 20 and the resiliency of the pad assure comfortable handling of the cart in moving it along a subjacent surface through the use of the improved integral handle means.

As discussed above, the edge wall 18 functions not only to provide a guide for the user's hand, but also to assure aligned relationship of the openings in the pad with the openings in the tabletop.

The wheeled table of the present invention is extremely simple and economical of construction, while providing an improved handle arrangement for facilitated positioning of the tabletop when desired.

The foregoing disclosure of specific embodiments is illustrative of the broad inventive concepts comprehended by the invention.

I claim:

1. A wheeled table comprising:
a base section;
wheels mounted to said base section for selective positioning of the table on a subjacent floor surface;
a tabletop carried by an upper section on said base section, said tabletop defining a flat upper surface, and an edge portion provided with an elongated opening spaced inwardly from a peripheral edge thereof for extension of the fingers of a user's hand downwardly through said upper surface with the palm of the user's hand overlying said edge portion outwardly from said opening; and
upstanding means at said peripheral edge for causing the user's palm to be elevated from the flat plane of the tabletop upper surface.

2. The wheeled table of claim 1 wherein said upstanding means comprises a peripheral wall.

3. The wheeled table of claim 1 wherein said upstanding means comprises a peripheral wall having a rounded upper edge.

4. The wheeled table of claim 1 wherein said upstanding means comprises a peripheral wall, said opening having a preselected length, and said peripheral wall adjacent said opening extending at least fully said length of the opening and having a rounded upper edge.

5. The wheeled table of claim 1 wherein a rounded bead is provided at a lower edge of said opening for engagement by the user's fingers extended through the opening.

6. The wheeled table of claim 1 wherein said upstanding means comprises a peripheral wall having a rounded upper edge and a rounded bead is provided at a lower edge of said opening for engagement by the user's fingers extended through the opening.

7. A wheeled table comprising:
a plurality of legs;
wheels mounted to said legs for selective positioning of the table on a subjacent floor surface;
a tabletop carried by an upper portion of said legs, said tabletop defining a flat upper surface, and an edge portion provided with an elongated opening spaced inwardly from a peripheral edge thereof for extension of the fingers of a user's hand downwardly through said upper surface with the palm of the user's hand overlying said edge portion outwardly from said opening; and
a pad removably carried on said top surface and having an opening substantially congruent with said tabletop opening.

8. The wheeled table of claim 7 wherein said tabletop is provided with upstanding flange means for maintaining said pad against transverse displacement on said tabletop.

9. The wheeled table of claim 7 wherein said tabletop is provided with an upstanding peripheral flange defining means for maintaining said pad against transverse displacement on said tabletop.

10. The wheeled table of claim 7 wherein said tabletop is provided with an upstanding peripheral flange defining means having a rounded upper edge portion for maintaining said pad against transverse displacement on said tabletop.

11. A wheeled table comprising:
a base section;
wheels mounted to said base section for selective positioning of the table on a subjacent floor surface;
an upper section mounted above said base section;
a tabletop carried by said upper section, said tabletop defining a flat upper surface, and an edge portion provided with an elongated opening spaced inwardly from a peripheral edge thereof for extension of the fingers of a user's hand downwardly through said upper surface with the palm of the user's hand overlying said edge portion outwardly from said opening;

a pad removably carried on said top surface and having an opening substantially congruent with said tabletop opening; and upstanding means at said peripheral edge for causing the user's palm to be elevated from the flat plane of the tabletop upper surface, said upstanding means further defining means for maintaining said pad against transverse displacement on said tabletop.

12. The wheeled table of claim 11 wherein said tabletop is provided with at least one additional such elongated opening and said pad is provided with openings congruent one each to each of said tabletop openings.

13. The wheeled table of claim 11 wherein said edge portion defines a longitudinal extent, said tabletop being provided with at least one additional such elongated opening and said pad is provided with openings congruent one each to each of said tabletop openings, each opening defining arcuate end edges and straight side edges, said side edges extending parallel to said lengthwise extent of said edge portion.

14. The wheeled table of claim 11 wherein said pad is formed of a resilient sheet material.

15. The wheeled table of claim 11 wherein said upstanding means comprises an upstanding wall extending substantially fully about said pad.

16. The wheeled table of claim 11 wherein said tabletop is provided with a second opening having a configuration different from that of said elongated opening and said pad includes an opening substantially congruent with said second tabletop opening.

* * * * *